(12) United States Patent
Sun et al.

(10) Patent No.: US 12,556,759 B2
(45) Date of Patent: Feb. 17, 2026

(54) METHOD AND DEVICE FOR VIDEO EDITING

(71) Applicant: Beijing Zitiao Network Technology Co., Ltd., Beijing (CN)

(72) Inventors: Chengzuo Sun, Beijing (CN); Chun Wang, Beijing (CN); Shaoqiang Wu, Beijing (CN); Xiaofei Li, Beijing (CN); Yongpan Song, Beijing (CN); Weijie Ni, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 109 days.

(21) Appl. No.: 18/570,482

(22) PCT Filed: May 15, 2023

(86) PCT No.: PCT/CN2023/094309
§ 371 (c)(1),
(2) Date: Dec. 14, 2023

(87) PCT Pub. No.: WO2023/241283
PCT Pub. Date: Dec. 21, 2023

(65) Prior Publication Data
US 2025/0097517 A1 Mar. 20, 2025

(30) Foreign Application Priority Data
Jun. 16, 2022 (CN) .......................... 202210684585.8

(51) Int. Cl.
*H04N 21/431* (2011.01)
*H04N 21/44* (2011.01)
*H04N 21/472* (2011.01)

(52) U.S. Cl.
CPC ... *H04N 21/4318* (2013.01); *H04N 21/44016* (2013.01); *H04N 21/47205* (2013.01)

(58) Field of Classification Search
CPC ......... H04N 21/4318; H04N 21/44016; H04N 21/47205; H04N 21/25808; H04N 21/854;
(Continued)

(56) References Cited

U.S. PATENT DOCUMENTS

2008/0112683 A1 5/2008 Lin et al.
2012/0311448 A1* 12/2012 Achour ................ G06Q 10/101
715/723
(Continued)

FOREIGN PATENT DOCUMENTS

CN 103514351 A 1/2014
CN 108965397 A 12/2018
(Continued)

OTHER PUBLICATIONS

Office action received from Japanese patent application No. 2024-561601 mailed on May 7, 2025, 6 pages (3 pages English Translation and 3 pages Original Copy).

*Primary Examiner* — Cynthia M Fogg

(57) ABSTRACT

Embodiments of the disclosure provide a method and device for video editing. The method includes: obtaining a first video draft generated by a first client, which includes first editing capability information supported by a first client but not supported by a second client; performing an editing operation on a first video clip based on the first editing capability information to obtain the second video clip, whereby the first video clip and the first editing capability information overlap on the video editing time line; replacing, in the first video draft, the first video clip with the second video clip, and deleting the first editing capability information to obtain the second video draft; and providing the second video draft to the second client.

18 Claims, 4 Drawing Sheets

(58) Field of Classification Search
CPC .. H04N 21/2743; H04N 5/265; H04N 21/234; H04N 21/44; H04N 21/440245; H04N 21/443; H04N 21/4516
USPC ......................................................... 725/116
See application file for complete search history.

(56) References Cited

U.S. PATENT DOCUMENTS

| | | | | |
|---|---|---|---|---|
| 2014/0096002 | A1* | 4/2014 | Dey | .................... G06F 3/04817 |
| | | | | 715/723 |
| 2016/0293216 | A1* | 10/2016 | Tost | .................... H04L 65/4038 |
| 2017/0345459 | A1* | 11/2017 | Manville | ............ H04N 21/2402 |
| 2021/0252401 | A1* | 8/2021 | Karlsson | .................. A63F 13/35 |
| 2022/0262405 | A1* | 8/2022 | Conlin | .................... G06Q 10/06 |

FOREIGN PATENT DOCUMENTS

| | | | |
|---|---|---|---|
| CN | 112738573 | A | 4/2021 |
| CN | 113099130 | A | 7/2021 |
| CN | 113722040 | A | 11/2021 |
| CN | 114095755 | A | 2/2022 |
| CN | 114125551 | A | 3/2022 |
| JP | 2003-526227 | A | 9/2003 |
| JP | 2004-274760 | A | 9/2004 |
| JP | 2008-537856 | A | 9/2008 |
| JP | 2009-542046 | A | 11/2009 |

* cited by examiner

METHOD AND DEVICE FOR VIDEO EDITING

CROSS REFERENCE

This application claims priority to Chinese Patent Application No. 202210684585.8 filed with the China National Intellectual Property Administration on Jun. 16, 2022 and entitled "Method and Device for Video Editing", which is hereby incorporated by reference in its entirety.

FIELD

Embodiments of the present disclosure relate to the field of information technology, and in particular to a method and device for video editing.

BACKGROUND

With the development of information processing technology, video editing is becoming more and more widely applied. Solutions of video editing can support video editing functions to run on various types of clients. For example, video editing operations may be be performed through web pages, personal computers (PCs), or mobile terminals.

Video editing tools logged in through different clients may generate video drafts through a series of editing operations. Users may open the same video draft several times for editing or exporting. However, currently, general solutions only support opening or editing video drafts created by clients of the same type. Since different clients correspond to different terminal device types or different versions of video editing tools, the editing capabilities supported by respective clients are different. This leads to clients with poor editing capabilities to be unable to open or edit video drafts generated by other clients. For example, video editing tools logged in through the webpage side usually have poor performance and editing capabilities, so there are situations where users cannot open video drafts to be edited.

With respect to the above issues, there is a need in the art for a solution to improve compatibility of video editing tools in various operating scenarios.

SUMMARY

The present disclosure provides a method and device for video editing to solve the problem that a client with poor editing capability cannot open or edit video drafts generated by other clients.

In a first aspect, embodiments of the present disclosure provides a method for video editing, comprising: obtaining a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing; performing an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline; replacing, in the first video draft, the first video clip with the second video clip, and deleting the at least one piece of first editing capability information to obtain the second video draft; and providing the second video draft to the second client.

In a second aspect, embodiments of the present disclosure provides an device for video editing, comprising: an obtaining module configured to obtain a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing; an editing module configured to perform an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline; the editing module is further configured to replace, in the first video draft, the first video clip with the second video clip, and delete the at least one piece of first editing capability information to obtain the second video draft; and a providing module configured to provide the second video draft to the second client.

In a third aspect, embodiments of the present disclosure provides an electronic device comprising: a processor and a memory. The memory stores computer-executable instructions. The processor executes the computer-executable instructions stored in the memory to cause at least one processor to implement a method for video editing in the first aspect and various possible designs in the first aspect.

In a fourth aspect, embodiments of the present disclosure provides a computer-readable storage medium having computer-executable instructions stored thereon. The computer-executable instructions, when executed by a processor cause a method for video editing in the first aspect and various possible designs in the first aspect to be implemented.

In a fifth aspect, embodiments of the present disclosure provides a computer program product comprising a computer program that, when executed by a processor, causes a method for video editing in the first aspect and various possible designs of the first aspect to be implemented.

In a sixth aspect, embodiments of the present disclosure provides a computer program that, when executed by a processor, causes a method for video editing in the first aspect and various possible designs of the first aspect to be implemented.

BRIEF DESCRIPTION OF THE DRAWINGS

In order to more clearly illustrate the technical solutions in embodiments of the present disclosure or the prior art, a brief introduction will be made to the drawings required for descriptions of the embodiments or the prior art. Obviously, the drawings described below are some embodiments of the present disclosure. For those skilled in the art, other drawings can be obtained based on these drawings, without creative efforts.

DETAILED DESCRIPTION

In order to make the purpose, technical solutions, and advantages of embodiments of the present disclosure clearer, the technical solutions in embodiments of the present disclosure will be clearly and completely described below in conjunction with the accompanying drawings. Obviously, the described embodiments are part of the embodiments of the present disclosure, not all of them. Based on the embodiments of the present disclosure, all other embodiments obtained by those skilled in the art without creative efforts are within the scope of protection of the present disclosure.

In embodiments of the present disclosure, video editing capability information and some video clips in the first video draft generated by the first client may be composited into a second video clip based on the editing capability that the second client does not support, and the relevant content that the second client does not support in the first video draft may be replaced to generate a second video draft and provide it to the second client. Since the second video draft obtained after the replacement does not include the editing capability information that is not supported by the second client, the second client with poor editing capability may also open and edit the second video draft, which improves versatility of a video editing tool at different clients.

Figure 1:
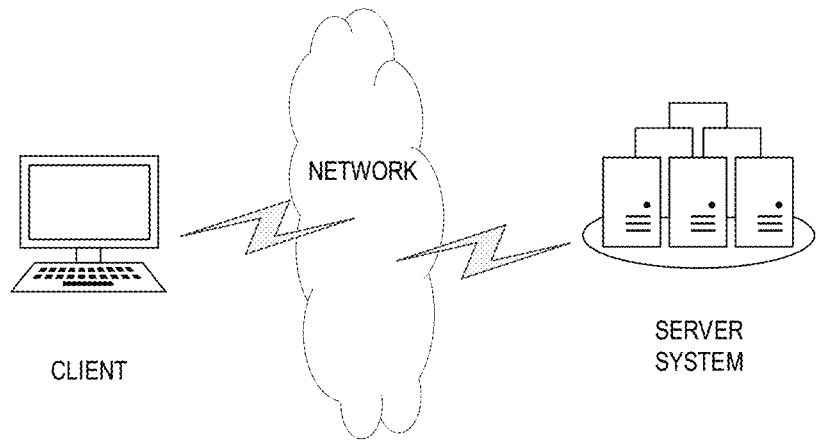
FIG. 1 is a schematic diagram of a possible application scenario according to an embodiment of the present disclosure.

FIG. 1 is a schematic diagram of a possible application scenario of an embodiment of the present disclosure. As shown in FIG. 1, the scenario includes a client and a server system. The client communicates and interacts with the server system through a network to implement functions of video editing.

In embodiments of the present disclosure, the above-mentioned clients may include different types which, for example, may be distinguished by a version type of a video editing application and a type of a terminal device on which the video editing application is installed. As an example, the version type of the video editing application may include different application installation environments such as web pages, personal computers (PCs), and mobile terminals. Alternatively, the version type of the video editing application may also include updated versions at different times.

For example, the PC version and the mobile end version may download and install applications or plugins with video editing functions on computer devices or mobile terminals, perform video editing locally, and save the edited video locally or upload it to the server system.

In another example, the web version may refer to the situation where video editing is performed through a browser. The terminal device may access the server system through the browser and perform operations of the video editing through the server system. In practice, the server system may receive a request for the video editing sent from a user through the browser and perform operations of the video editing. Alternatively, the browser may download the tools and video drafts needed for video editing through the server system and cache them locally for video editing. The server system may provide access services for the video drafts, for example, the edited video may be stored in the server system, for instance, in a database.

Optionally, the above video draft may be uploaded by a client which is currently editing, uploaded by another client and pre-stored in the server system, or provided by the server system itself. As an example, the video draft may include video clip(s) and editing capability information. The above editing capability information is used to indicate editing operations on the video clip(s). As an example, the above editing capability information may include, but not limited to, image information, special effects information, variable speed information, text information, and audio information. The above special effects information may include special effects filters, special effects filter stickers, and so on. The above editing capability information may be composited with the video clip(s) along a video editing timeline to finally obtain the composited video.

Alternatively, the terminal device may include, but not limited to, a mobile terminal such as a mobile phone, a laptop, a digital broadcast receiver, a personal digital assistant (PDA), a tablet computer (Portable Android Device, PAD), a portable multimedia player (Portable Media Player, PMP), an onboard terminal (such as a car navigation terminal), and a fixed terminal such as a digital TV, a desktop computer, and the like.

The above server system may refer to an independent physical server, a server cluster or a distributed system including a plurality of physical servers, or a cloud server. As an example, in the case that the server system includes a plurality of servers, different servers may be responsible for different functions. For example, the above servers may include but are not limited to the following: a scheduling server for achieving load balance based on a load rate of a logical server; the logical server for providing an interface for the front-end to access a database and perform tasks of video editing; the database for providing tools or materials required for video editing, and for storing video data; and a video composition server for performing video composition operations based on video drafts and related editing operations, and generating videos.

As mentioned earlier, Prior Art only supports using the same type of client to open or edit video drafts, which limits the situation of editing the same video draft through different types of clients, affecting user experience and application flexibility.

In order to solve the above problems, embodiments of the present disclosure provides a method and device for video editing. In this method, capability may be analyzed in terms of video drafts, and an editing capability that a client does not support may be determined. The first video clip in the video draft and the unsupported editing capability may be composited into a second video clip. The second video clip is used to replace the unsupported editing capability and the first video clip in the video draft, so that the client with poor editing capability can open and edit the video draft as well, which improves the versatility of the video editing tool at different clients.

Figure 2:
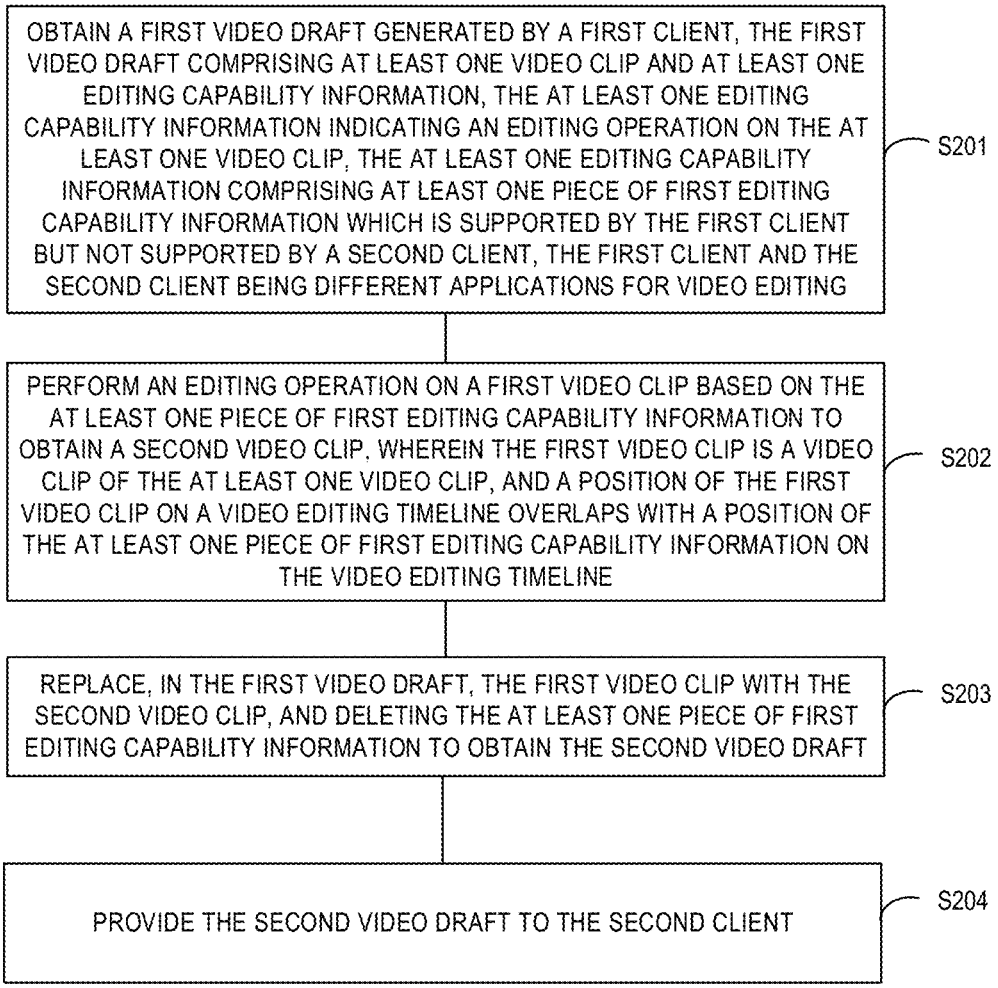
FIG. 2 is a schematic diagram of a flowchart of a method for video editing according to an embodiment of the present disclosure.

FIG. 2 is a flowchart of a method for video editing according to an embodiment of the present disclosure. The method may be executed by the server system of FIG. 1 or by other devices. As shown in FIG. 2, the method includes the following contents.

S201, obtaining a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing.

As an example, the video draft may include video clip(s) and editing capability information. The above editing capability information is used to indicate editing operations on the video clip(s). As an example, the above editing capability information may include, but not limited to, image information, special effects information, variable speed information, text information, and audio information. The above special effects information may include special effects filters, special effects filter stickers, and so on. The above editing capability information may be composited with the video clip(s) along a video editing timeline to finally obtain the composited video.

Optionally, before obtaining the first video draft, the method of FIG. 2 further includes: receiving, from the second client, video request information for requesting a video draft corresponding to a video editing task, the first video draft and the second video draft corresponding to the video editing task.

As an example, the user may perform an operation of opening the video draft through the second client, thereby triggering the second client to send video request information to the server system.

As an example, the above video request information may include address information of the first video draft, and the server system may obtain the first video draft based on the address information. The first video draft may be stored in the server system, for example, in a database in the server system, or in other types of storage devices.

It should be understood that due to the different types of clients, the editing capabilities supported by different clients are different. For example, the above different client types include different types of terminal devices, and different versions of video editing applications or plugins. For example, in the case that the client logs in with a browser or the version of the video editing application is an earlier version, it supports poor editing capabilities.

Alternatively, the first client and the second client are of different types. For example, versions of video editing applications at the first client and the second client may be different, or terminal devices at the first client and the second client are of different types.

For example, the first client may be at a PC side, and the second client may be at a webpage side.

As an example, the server system may be accessed via the webpage side through a browser and video drafts may be then opened and edited. For example, the webpage side may present video editing web pages and a user interface through a browser. Through the browser, video editing instructions input from a user are collected via the user interface, the video draft is edited according to the video editing instructions, and the edited draft is uploaded to the server system for saving.

S202, performing an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline.

An editing operation is performed on the first video clip according to at least one piece of first editing capability information to obtain the second video clip, which may refer to compositing at least one piece of first editing capability information and the first video clip into a second video clip. As an example, the above-mentioned task of obtaining the second video clip may be implemented by a dedicated server in the server system. For example, the server system may include a logical server and a video composition server, which may initiate the compositing task of the second video clip and send to the video composition server the information required for compositing the video, which includes the first video clip and at least one editing capability information. After compositing the second video clip, the video composition server may send the second video clip to the logical server.

As an example, in determination of the at least one piece of first editing capability information that is not supported by the second client, the server system may obtain a first editing capability list that is pre-stored, whereby the first editing capability list is used to indicate editing capability information that is not supported by different client types. For example, the first editing capability list may include editing capability information that is not supported by a browser, at least one type of a terminal device, or at least one version of a video editing application. The first editing capability list may be obtained in advance and stored in the server system by technical developers, and may be updated later. The server system queries the editing capability information that is not supported by the second client in the first editing capability list according to the type of the second client.

Optionally, the second client may send information indicating the type of the second client to the server system, or the server system may determine the type of the second client through communication with the second client.

After determining the editing capability information that the second client does not support, the server system may filter the first video draft, determine the first editing capability information that the first client supports and the second client does not support, and composite the first editing capability information and the corresponding first video clip to generate the second video clip.

Optionally, the server system may send notification information to the second client to notify the second client of the progress of the composition task of the second video clip.

S203, replacing, in the first video draft, the first video clip with the second video clip, and deleting the at least one piece of first editing capability information to obtain the second video draft.

It should be understood that after replacing the first video clip with the second video clip and deleting at least one piece first editing capability information, since the first editing capability information that the second client does not support has been composited into the second video clip, there is no editing capability that the second client does not support in the second video draft. The second client may open the second video draft normally and edit it, thereby solving the problem of universality of different types of clients opening the same video draft, which improves user experience.

It should also be understood that in the second video draft, the editing capabilities supported by the second client may still be performed on the basis of the second video clip. In other words, the second video clip may be edited as the original video.

Optionally, after generating the second video draft, the server system may send notification information to the second client to notify the second client that the second video draft may be opened and edited.

S204, providing the second video draft to the second client.

For example, the second client may send a second video draft. After the second client receives the second video draft, the user may open and edit the second video draft through the second client.

In embodiments of the present disclosure, based on the editing capability that the second client does not support, some video clips and video editing capability information in the first video draft generated by the first client may be composited into a second video clip, which may be used to replace the relevant content that the second client does not support in the first video draft to generate a second video draft and provide it to the second client. Since the second video draft obtained after replacement does not include editing capability information that the second client does not support, the second client with poor editing capability may also open and edit the second video draft, which improves the versatility of the video editing tool at different clients.

Optionally, the method of FIG. 2 further includes recording draft repair information after obtaining the second video draft. The draft repair information is used to indicate an association of the second video clip with the first video clip and the at least one piece of first editing capability information.

In some examples, the server system may store draft repair information in a database and record identification information of the second video draft, identification information of the second client, and the like.

The above draft repair information may be used to restore the video draft to a version with higher editing capability in a subsequent process. For example, the above draft repair information may be applied to the process of storing the edited third video draft in the second client, whereby the third video draft is edited based on the second video draft. The server system may use the draft repair information to restore the editing capability information deleted from the third video draft, to facilitate other types of clients to open and edit the video draft in the subsequent process.

Optionally, the method of FIG. 2 further includes: receiving a third video draft sent from the second client, the third video draft being a video draft obtained by editing based on the second video draft, the third video draft comprising the second video clip; and replacing the third video draft in the second video clip with the first video clip based on the draft repair information, and adding the at least one piece of first editing capability information to obtain a fourth video draft.

As an example, the server system may receive video saving request information sent from the second client, and the video saving request information is used to request for storing the third video draft. The third video draft is a video draft obtained after editing the second video draft. The server system replaces the second video clip in the third video draft with the first video clip based on the draft repair information, and adds the at least one piece of first editing capability information to obtain the fourth video draft. The server system may store the fourth video draft in the database.

In the embodiments of the present disclosure, in the case that the second client completes editing the video draft and requests for storing the video draft in the database, the server system may, based on the draft repair information, reversely restore the editing capability deleted from the video draft, so as to facilitate other types of clients to open and edit the video draft in the subsequent process, which improves the applicability of video editing in different types of clients and improves user experience.

Figure 3:
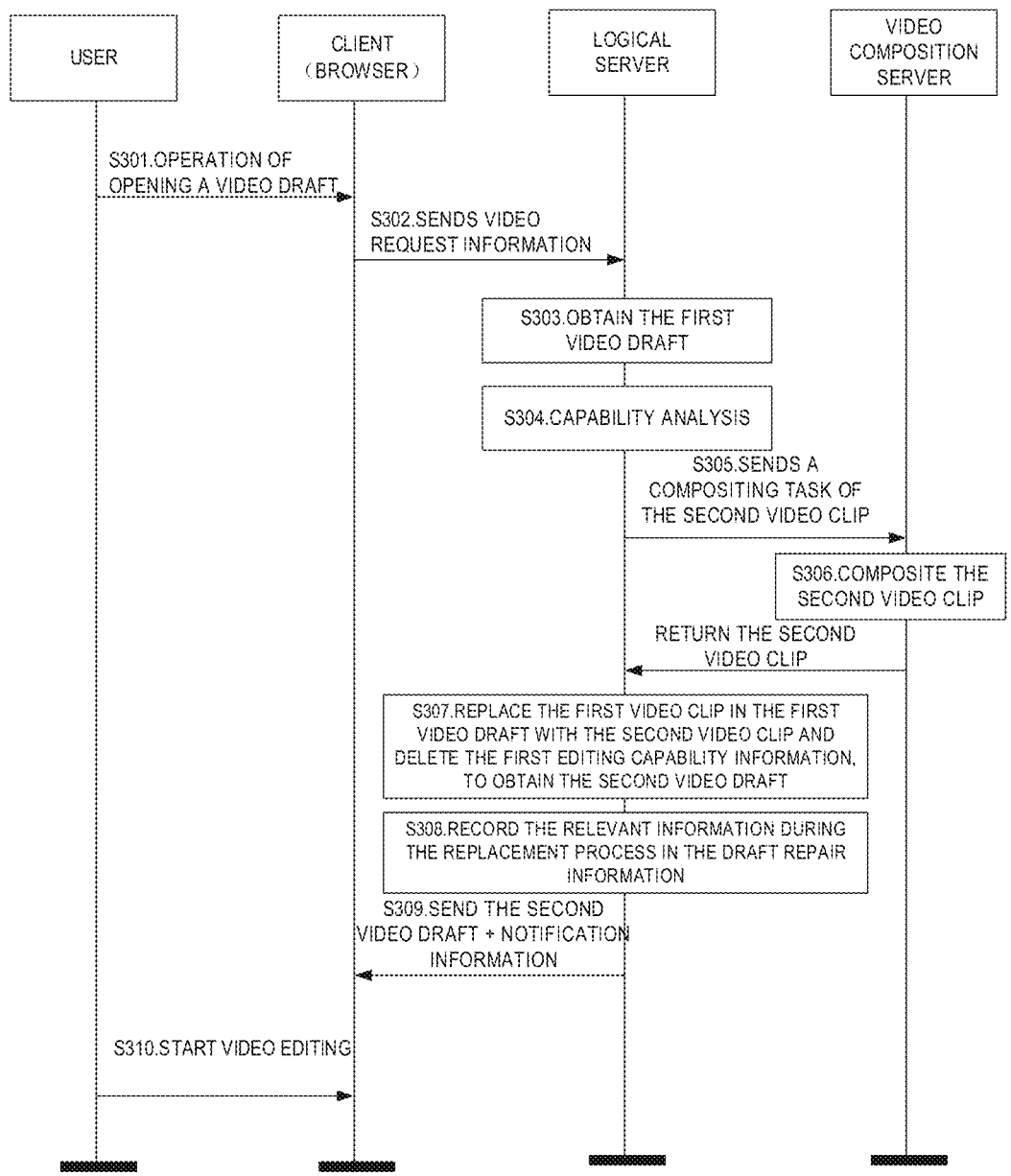
FIG. 3 is a schematic diagram of a specific process of a method for video editing according to an embodiment of the present disclosure.

FIG. 3 is a schematic diagram of a specific flow of a method for video editing according to an embodiment of the present disclosure. FIG. 3 mainly shows the processing scheme for users to open video drafts for editing, and describes it by taking the web page as an example of a client and by using a server system including a logical server and a video composition server. As shown in FIG. 3, the method includes the following steps.

At S301, the client displays a human-machine interaction interface in a browser to the user, and the user performs an operation of opening a video draft through the human-machine interaction interface.

At S302, the client sends video request information to the logical server through the browser, and the video request information is used to request the acquisition of a video draft of the video to be edited.

At S303, the logic server obtains the first video draft.

Optionally, the video request information may include address information of the first video draft, so as to obtain the first video draft based on the address information. The first video draft may be stored in the server system, for example, in a database in the server system, or in other types of storage devices.

At S304, the logical server performs capability analysis on the client based on the video editing request to determine at least one piece of first editing capability information that the client does not support.

For example, the logical server may filter the first video draft based on the pre-stored "browser unsupported editing capability list" to determine whether there is at least one piece of first editing capability information that the browser does not support in the first video draft. If it does not exist, the logical server may directly send the first video draft to the client. If it exists, the logical server needs to initiate the video replacement process and continue with the subsequent steps.

At S305, the logic server sends a compositing task of the second video clip to the video composition server based on at least one piece of first editing capability information that the client does not support.

For example, the logic server may initiate the compositing task of the second video clip and send, to the video composition server, the information required for compositing the video, which includes the first video clip and at least one piece of first editing capability information.

As an example, the at least one piece of first editing capability information may include visual elements that use editing capabilities that are not supported by the client, as well as visual elements related to editing capabilities that are not supported by the client.

Optionally, the logical server may send notification information to the client to notify the client of the progress of the compositing task of the second video clip.

At S306, the video composition server composites the second video clip and returns a compositing task of the second video clip to the logical server.

For example, the video composition server may composite the second video clip based on the first video clip sent by the logical server and at least one piece of first editing capability information, and send the second video clip to the logical server.

At S307, the logic server replaces the first video clip in the first video draft with the second video clip, and deletes at least one piece of first editing capability information, to obtain the second video draft.

At S308, the logical server records the relevant information during the replacement process in the draft repair information and stores it in the database.

For example, the draft repair information may include an association between the second video clip with the first video clip and at least one piece of first editing capability information.

At S309, the logic server sends the second video draft and notification information to the client, so that the client can edit the second video draft.

The above notification information is used to notify the client to start editing the second video draft.

At S310, the user performs video editing operations on the second video draft through the client.

The server system may composite, based on the editing capability that the second client does not support, video editing capability information and some video clips of the first video draft generated by the first client into a second video clip, and replace the relevant content of the first video draft that is not supported by the second client to generate a second video draft and provide it to the second client. Since the second video draft obtained after replacement does not include editing capability information that the second client does not support, the second client with poor editing capability may also open and edit the second video draft, which improves the versatility of the video editing tool at different clients.

Figure 4:
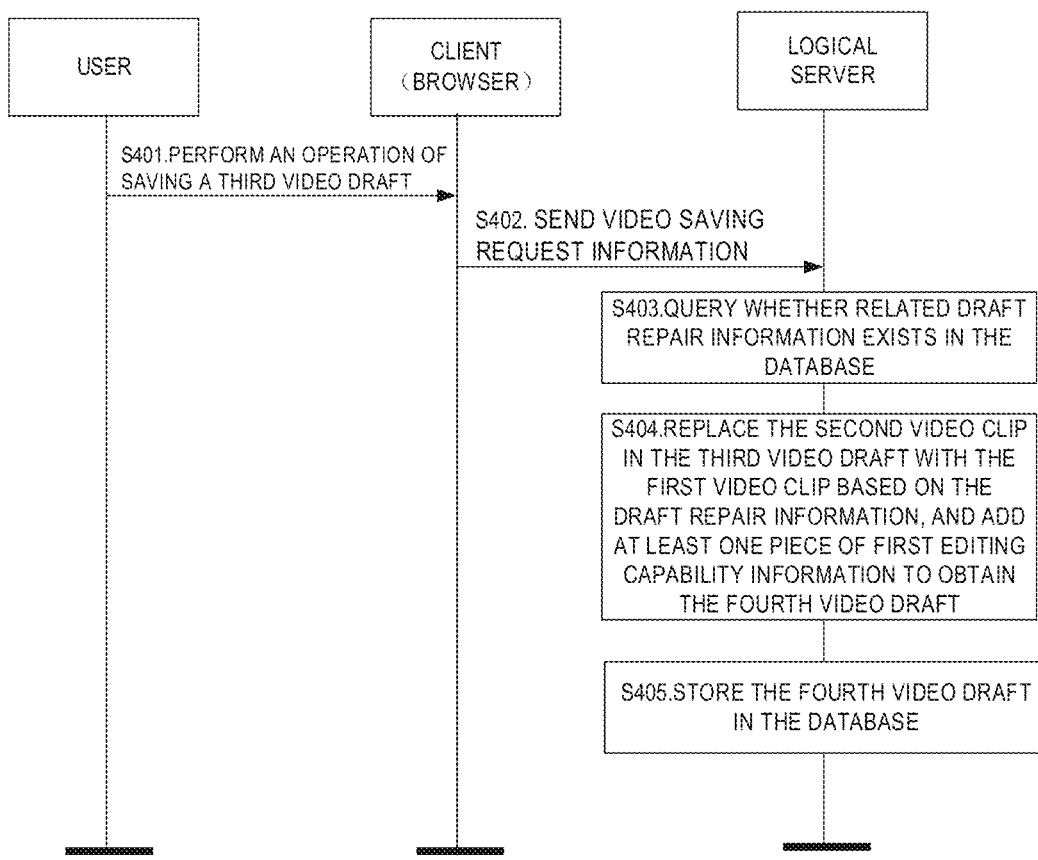
FIG. 4 is a schematic diagram of a specific process of the method for video editing according to another embodiment of the present disclosure.

FIG. 4 is a schematic diagram of a specific flow of a method for video editing according to another embodiment of the present disclosure. FIG. 4 mainly shows the processing scheme for users to open video drafts for editing, and describes it by taking the web page as an example of a client and by using a server system including a logical server. As shown in FIG. 4, the method includes the following contents.

At S401, the client displays a human-machine interaction interface in the browser to the user, and the user performs an operation of saving a third video draft through the human-machine interaction interface. The third video draft is a video draft edited by the second video draft.

At S402, the client sends the third video draft and video saving request information to the logical server, and the video saving request information is used to request for storing the third video draft.

At S403, the logical server queries whether the draft repair information related to the third video draft is saved in the database. If it exists, the draft repair information is obtained and S404 is executed; if it does not exist, the third video draft is directly stored in the database and the process ends.

At S404, the logic server replaces the second video clip in the third video draft with the first video clip based on the draft repair information, and adds at least one piece of first editing capability information to obtain the fourth video draft.

It may be understood that the logical server inserts into the third video draft editing capabilities that have been removed before and visual elements affected by editing capabilities, thereby obtaining a fourth video draft with complete editing capabilities.

At S405, the logical server stores the fourth video draft in the database for use by other types of clients.

The above clients may include other types of terminal devices or versions of other types of video editing application.

In the case that the client completes editing the video draft and requests for storing the video draft in the sever system, the server system may, based on the draft repair information, reversely restore the editing capability deleted from the video draft, so as to facilitate other types of clients to open and edit the video draft in the subsequent process, which improves the applicability of video editing in different types of clients and improves user experience.

Figure 5:
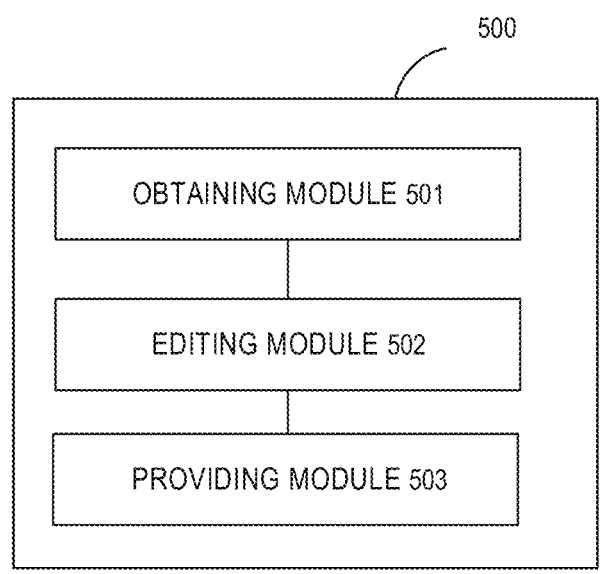
FIG. 5 is a structural block diagram of a device 500 for video editing provided in an embodiment of the present disclosure.

Corresponding to the method for video editing in the previous embodiments, FIG. 5 is a structural block diagram of a device 500 for video editing provided in embodiments of the present disclosure. For purpose of illustration, only the parts related to the present disclosure are shown. Referring to FIG. 5, the device includes: an obtaining module 501, an editing module 502, and a providing module 503.

The obtaining module 501 is configured to obtain a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing.

The editing module 502 is configured to perform an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline.

The providing module 503 is configured to provide the second video draft to the second client.

In one embodiment of the present disclosure, the obtaining module 501 is further configured to: receive, from the second client, video request information for requesting a video draft corresponding to a video editing task, the first video draft and the second video draft corresponding to the video editing task.

In one embodiment of the present disclosure, the obtaining module 501 is further configured to: obtain a first editing capability list, the first editing capability list indicating editing capability information that is not supported by different client types; and the editing module 502 is further configured to: determine the at least one piece of first editing capability information based on a type of the second client and the first editing capability list.

In one embodiment of the present disclosure, the client types include at least one of the following: a version type of video editing application, the type of terminal device to install the video editing application.

In one embodiment of the present disclosure, the editing module 502 is further configured to record draft repair information, the draft repair information indicating an association of the second video clip with the first video clip and the at least one piece of first editing capability information.

In one embodiment of the present disclosure, the obtaining module 501 is further configured to receive a third video draft sent from the second client, the third video draft being a video draft obtained by editing based on the second video draft, the third video draft comprising the second video clip; and the editing module 502 is further configured to replace the third video draft in the second video clip with the first video clip based on the draft repair information, and adding the at least one piece of first editing capability information to obtain a fourth video draft.

Figure 6:
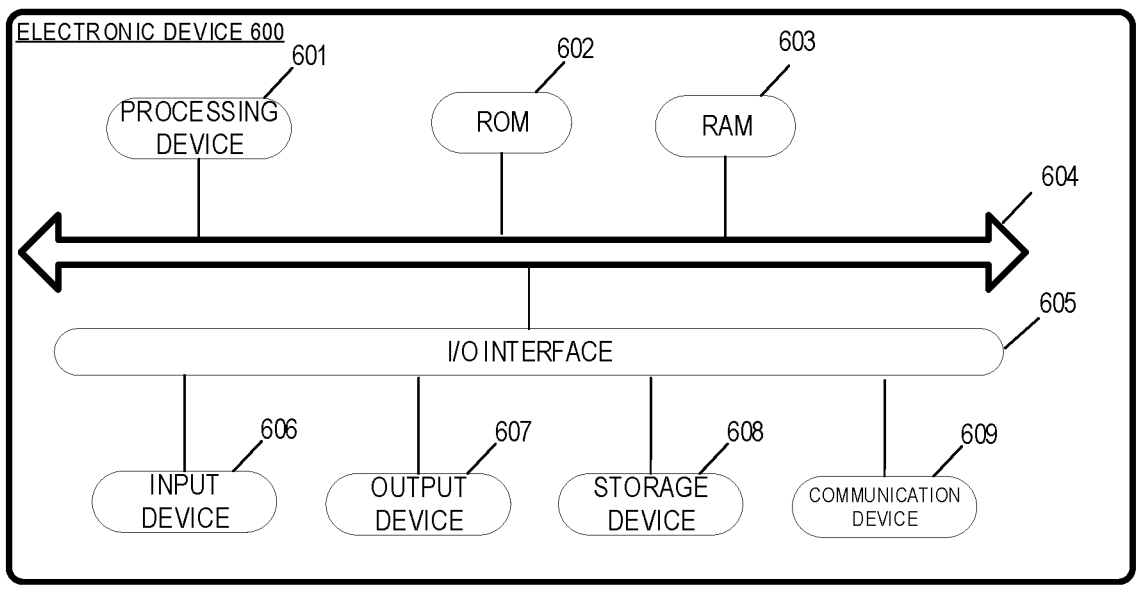
FIG. 6 is a schematic diagram of a structure of an electronic device 600 according to an embodiment of the present disclosure.

FIG. 6 is a schematic diagram of the structure of an electronic device 600 according to an embodiment of the present disclosure. The electronic device 600 may be a server or a device of another type. The electronic device may be used to perform the steps in the methods described in the present disclosure.

As shown in FIG. 6, the electronic device 600 may include a processing device (such as a Central Processor, graphics processing unit, etc.) 601, which may perform various appropriate actions and processes based on programs stored in Read Only Memory (ROM) 602 or programs loaded from storage device 608 into Random Access Memory (RAM) 603. In RAM 603, various programs and data required for the operation of the electronic device 600 are also stored. The processing device 601, ROM 602, and RAM 603 are connected to each other through a bus 604. The input/output (I/O) interface 605 is also connected to the bus 604.

Typically, the following devices may be connected to the I/O interface 605, including but not limited to, an input device 606 such as touch screens, touchpads, keyboards, mice, cameras, microphones, accelerometers, gyroscopes, etc.; output device 607 including, for example, liquid crystal displays (LCDs), speakers, vibrators, etc.; storage device 608 including magnetic tapes, hard disks, etc.; and communication device 609. The communication device 609 may allow electronic device 600 to communicate via wire or wirelessly with other apparatuses to exchange data. Although FIG. 6 shows an electronic device 600 with various apparatuses, it should be understood that it is not required to implement or have all of the devices shown. More or fewer devices may be implemented or provided instead.

In particular, according to the embodiments of the present disclosure, the process described above with reference to the flowchart may be implemented as a computer software program. For example, the embodiments of the present disclosure include a computer program product that includes a computer program carried on a computer-readable medium, the computer program containing program code for performing the method shown in the flowchart. In such embodiments, the computer program may be downloaded and installed from the network through the communication device 609, or from the storage device 608, or from the ROM 602. When the computer program is executed by the processing device 601, the above functions defined in the methods of the present disclosure are performed. The embodiments of the present disclosure include a computer program that implements the above functions defined in the methods of the present disclosure when executed by a processor.

It should be noted that the computer-readable medium described above in this disclosure may be a computer-readable signal medium or a computer-readable storage medium or any combination thereof. The computer-readable storage medium may be, for example, but not limited to, an electrical, magnetic, optical, electromagnetic, infrared, or semiconductor system, device, or any combination thereof. More specific examples of computer-readable storage media may include but are not limited to: an electrical connection with one or more wires, a portable computer disk, a hard disk, a random access memory (RAM), a read-only memory (ROM), an erasable programmable read-only memory (Electrical Programmable ROM, EPROM, or flash memory), an optical fiber, a portable compact disk read-only memory (CD-ROM), an optical storage device, a magnetic storage device, or any suitable combination thereof. In this disclosure, a computer-readable storage medium may be any tangible medium containing or storing a program that may be used by or in conjunction with an instruction execution system, apparatus, or device. In this disclosure, computer-readable signal media may include data signals propagated in baseband or as part of a carrier wave, which carry computer-readable program code. Such propagated data signals may take many forms, including but not limited to electromagnetic signals, optical signals, or any suitable combination thereof. Computer-readable signal media may also be any computer-readable medium other than computer-readable storage media, which may send, propagate, or transmit programs for use by or in combination with instruction execution systems, devices, or devices. The program code contained on the computer-readable medium may be transmitted using any suitable medium, including but not limited to: wires, optical cables, radio frequency (RF), etc., or any suitable combination thereof.

The computer-readable medium may be included in the electronic device, or it may exist alone without being assembled into the electronic device.

The computer-readable medium carries one or more programs that, when executed by the electronic device, cause the electronic device to perform the method shown in the above embodiments.

Computer program code for performing the operations of the present disclosure may be written in one or more programming languages, or combinations thereof, including Object Oriented programming languages such as Java, Smalltalk, C++, as well as conventional procedural programming languages such as "C" or similar programming languages. The program code may be executed entirely on the user's computer, partially on the user's computer, as a standalone software package, partially on the user's computer, partially on the remote computer, or entirely on the remote computer or server. In the case of a remote computer, the remote computer may be connected to the user's computer via any type of network, including a local area network (LAN) or a wide area network (WAN), or may be connected to an external computer (e.g., via the Internet using an Internet service provider).

The flowcharts and block diagrams in the accompanying drawings illustrate the architecture, functions, and operations of the system, method, and computer program product that may be implemented in accordance with various embodiments of the present disclosure. In this regard, each block in the flowcharts or block diagrams may represent a module, program segment, or portion of code that contains one or more executable instructions for implementing a specified logical function. It should also be noted that in some alternative implementations, the functions marked in the blocks may also occur in a different order than those marked in the drawings. For example, two consecutive blocks may actually be executed substantially in parallel, and they may sometimes be executed in a reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operation, or may be implemented using a combination of dedicated hardware and computer instructions.

The units described in embodiments of the present disclosures may be implemented by means of software or by means of hardware, whereby the name of the unit does not constitute a limitation on the unit itself under certain circumstances, for example, the first obtaining unit may also be described as "a unit that obtains at least two internet protocol addresses."

The functions described above in the present disclosure may be performed at least in part by one or more hardware logic components. For example, without limitation, example types of hardware logic components that may be used include: Field Programmable Gate Arrays (FPGAs), Application Specific Integrated Circuits (ASICs), Application Specific Standard Products (ASSPs), System on Chip (SOCs), Complex Programmable Logic Devices (CPLDs), and so on.

In the context of this disclosure, machine-readable media may be tangible media that may contain or store programs for use by or in conjunction with instruction execution systems, devices, or devices. Machine-readable media may be machine-readable signal media or machine-readable storage media. Machine-readable media may include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof.

In the first aspect, according to one or more embodiments of the present disclosure, a method for video editing is provided. The method comprises: obtaining a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing; performing an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline; replacing, in the first video draft, the first video clip with the second video clip, and deleting the at least one piece of first editing capability information to obtain the second video draft; and providing the second video draft to the second client.

According to one or more embodiments of the present disclosure, the method further includes: receiving, from the second client, video request information for requesting a video draft corresponding to a video editing task, the first video draft and the second video draft corresponding to the video editing task.

According to one or more embodiments of the present disclosure, the method further includes: obtaining a first editing capability list, the first editing capability list indicating editing capability information that is not supported by different client types; and determining the at least one piece of first editing capability information based on a type of the second client and the first editing capability list.

According to one or more embodiments of the present disclosure, the client types includes at least one of: a version type of the video editing application, or a type of a terminal device on which the video editing application is installed.

According to one or more embodiments of the present disclosure, the method further includes: recording draft repair information, the draft repair information indicating an association of the second video clip with the first video clip and the at least one piece of first editing capability information.

According to one or more embodiments of the present disclosure, the method further includes: receiving a third video draft sent from the second client, the third video draft being a video draft obtained by editing based on the second video draft, the third video draft comprising the second video clip; and replacing the third video draft in the second video clip with the first video clip based on the draft repair information, and adding the at least one piece of first editing capability information to obtain a fourth video draft.

In the second aspect, according to one or more embodiments of the present disclosure, a device for video editing is provided. The device comprises: an obtaining module configured to obtain a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing; an editing module configured to perform an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline; the editing module is further configured to replace, in the first video draft, the first video clip with the second video clip, and delete the at least one piece of first editing capability information to obtain the second video draft; and a providing module configured to provide the second video draft to the second client.

According to one or more embodiments of the present disclosure, the obtaining module is further configured to: receive, from the second client, video request information for requesting a video draft corresponding to a video editing task, the first video draft and the second video draft corresponding to the video editing task.

According to one or more embodiments of the present disclosure, the obtaining module is further configured to: obtain a first editing capability list, the first editing capability list indicating editing capability information that is not supported by different client types; and the editing module is further configured to: determine the at least one piece of first editing capability information based on a type of the second client and the first editing capability list.

According to one or more embodiments of the present disclosure, the client types include at least one of the following: a version type of video editing application, the type of terminal device to install the video editing application.

According to one or more embodiments of the present disclosure, the editing module is further configured to record draft repair information, the draft repair information indicating an association of the second video clip with the first video clip and the at least one piece of first editing capability information.

According to one or more embodiments of the present disclosure, the obtaining module is further configured to receive a third video draft sent from the second client, the third video draft being a video draft obtained by editing based on the second video draft, the third video draft comprising the second video clip; and the editing module is further configured to replace the third video draft in the second video clip with the first video clip based on the draft repair information, and adding the at least one piece of first editing capability information to obtain a fourth video draft.

In a third aspect, according to one or more embodiments of the present disclosure, an electronic device is provided, which comprises: at least one processor and a memory. The memory stores computer-executable instructions. The at least one processor executes the computer-executable instructions stored in the memory to cause at least one processor to implement a method for video editing in the first aspect and various possible designs in the first aspect.

In a fourth aspect, according to one or more embodiments of the present disclosure, a computer-readable storage medium is provide. The computer-readable storage medium has computer-executable instructions stored thereon. The computer-executable instructions, when executed by a processor, cause a method for video editing in the first aspect and various possible designs in the first aspect to be implemented.

In a fifth aspect, according to one or more embodiments of the present disclosure, a computer program product is provided, which comprises a computer program that, when executed by a processor, causes a method for video editing in the first aspect and various possible designs of the first aspect to be implemented.

In a sixth aspect, embodiments of the present disclosure provides a computer program that, when executed by a processor, causes a method for video editing in the first aspect and various possible designs of the first aspect to be implemented.

The above description is only the best embodiment of the present disclosure and an explanation of the technical principles used. Those skilled in the art should understand that the scope of the disclosure involved in this disclosure is not limited to technical solutions composed of specific combinations of the above technical features, but should also cover other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although various operations are depicted in a specific order, this should not be understood as requiring these operations to be performed in the specific order shown or in a sequential order. In certain environments, multitasking and parallel processing may be advantageous. Similarly, although several specific implementation details are included in the above discussion, these should not be construed as limiting the scope of the present disclosure. Certain features described in the context of individual embodiments can also be implemented in combination in a single embodiment. Conversely, various features described in the context of a single embodiment can also be implemented separately or in any suitable subcombination in multiple embodiments.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

The invention claimed is:

1. A method for video editing, comprising:
   obtaining a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing;
   performing an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline;
   replacing, in the first video draft, the first video clip with the second video clip, and deleting the at least one piece of first editing capability information to obtain a second video draft; and
   providing the second video draft to the second client.

2. The method of claim 1, further comprising:
   receiving, from the second client, video request information for requesting a video draft corresponding to a video editing task, the first video draft and the second video draft corresponding to the video editing task.

3. The method of claim 1, further comprising:
   obtaining a first editing capability list, the first editing capability list indicating editing capability information that is not supported by different client types; and
   determining the at least one piece of first editing capability information based on a type of the second client and the first editing capability list.

4. The method of claim 3, wherein the client types comprise at least one of:
   a version type of a video editing application, or
   a type of a terminal device on which the video editing application is installed.

5. The method of claim 1, further comprising:
   recording draft repair information, the draft repair information indicating an association of the second video clip with the first video clip and the at least one piece of first editing capability information.

6. The method of claim 5, further comprising:
   receiving a third video draft sent from the second client, the third video draft being a video draft obtained by editing based on the second video draft, the third video draft comprising the second video clip; and
   replacing the third video draft in the second video clip with the first video clip based on the draft repair information, and adding the at least one piece of first editing capability information to obtain a fourth video draft.

7. An electronic device, comprising a processor and a memory,
the memory storing computer-executable instructions; and
the processor executing the computer-executed instructions stored in the memory to cause the processor to implement a method for video editing comprising:
obtaining a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing;
performing an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline;
replacing, in the first video draft, the first video clip with the second video clip, and deleting the at least one piece of first editing capability information to obtain a second video draft; and
providing the second video draft to the second client.

8. The device of claim 7, wherein the method further comprises:
receiving, from the second client, video request information for requesting a video draft corresponding to a video editing task, the first video draft and the second video draft corresponding to the video editing task.

9. The device of claim 7, wherein the method further comprises:
obtaining a first editing capability list, the first editing capability list indicating editing capability information that is not supported by different client types; and
determining the at least one piece of first editing capability information based on a type of the second client and the first editing capability list.

10. The device of claim 7, wherein the client types comprise at least one of:
a version type of a video editing application, or
a type of a terminal device on which the video editing application is installed.

11. The device of claim 7, wherein the method further comprises:
recording draft repair information, the draft repair information indicating an association of the second video clip with the first video clip and the at least one piece of first editing capability information.

12. The device of claim 11, wherein the method further comprises:
receiving a third video draft sent from the second client, the third video draft being a video draft obtained by editing based on the second video draft, the third video draft comprising the second video clip; and
replacing the third video draft in the second video clip with the first video clip based on the draft repair information, and adding the at least one piece of first editing capability information to obtain a fourth video draft.

13. A non-transitory computer readable storage medium having computer-executable instructions stored thereon which, when executed by a processor, implementing a method for video editing comprising:
obtaining a first video draft generated by a first client, the first video draft comprising at least one video clip and at least one editing capability information, the at least one editing capability information indicating an editing operation on the at least one video clip, the at least one editing capability information comprising at least one piece of first editing capability information which is supported by the first client but not supported by a second client, the first client and the second client being different applications for video editing;
performing an editing operation on a first video clip based on the at least one piece of first editing capability information to obtain a second video clip, wherein the first video clip is a video clip of the at least one video clip, and a position of the first video clip on a video editing timeline overlaps with a position of the at least one piece of first editing capability information on the video editing timeline;
replacing, in the first video draft, the first video clip with the second video clip, and deleting the at least one piece of first editing capability information to obtain a second video draft; and
providing the second video draft to the second client.

14. The non-transitory computer-readable medium of claim 13, wherein the method further comprises:
receiving, from the second client, video request information for requesting a video draft corresponding to a video editing task, the first video draft and the second video draft corresponding to the video editing task.

15. The non-transitory computer-readable medium of claim 13, wherein the method further comprises:
obtaining a first editing capability list, the first editing capability list indicating editing capability information that is not supported by different client types; and
determining the at least one piece of first editing capability information based on a type of the second client and the first editing capability list.

16. The non-transitory computer-readable medium of claim 15, wherein the client types comprise at least one of:
a version type of a video editing application, or
a type of a terminal device on which the video editing application is installed.

17. The non-transitory computer-readable medium of claim 13, wherein the method further comprises:
recording draft repair information, the draft repair information indicating an association of the second video clip with the first video clip and the at least one piece of first editing capability information.

18. The non-transitory computer-readable medium of claim 17, wherein the method further comprises:
receiving a third video draft sent from the second client, the third video draft being a video draft obtained by editing based on the second video draft, the third video draft comprising the second video clip; and
replacing the third video draft in the second video clip with the first video clip based on the draft repair information, and adding the at least one piece of first editing capability information to obtain a fourth video draft.

* * * * *